United States Patent [19]

Nabors et al.

[11] Patent Number: 5,781,571
[45] Date of Patent: Jul. 14, 1998

[54] OPTICAL PARAMETRIC OSCILLATOR WITH PORRO PRISM CAVITY

[75] Inventors: C. David Nabors, Sunnyvale; George Frangineas, Fremont, both of Calif.

[73] Assignee: Coherent, Inc., Santa Clara, Calif.

[21] Appl. No.: 944,250

[22] Filed: Oct. 6, 1997

Related U.S. Application Data

[63] Continuation of Ser. No. 657,104, Jun. 3, 1996, abandoned.

[51] Int. Cl.[6] .................. H01S 3/10; G02F 1/35
[52] U.S. Cl. .................. 372/21; 372/69; 372/70; 372/72; 372/92; 372/99; 372/100; 359/330; 359/346
[58] Field of Search .................. 372/21, 22, 23, 372/69, 70, 71, 72, 75, 92, 98, 99, 100, 107, 108; 359/333, 345, 346, 347, 348, 330

[56] References Cited

U.S. PATENT DOCUMENTS

| | | | |
|---|---|---|---|
| 3,454,902 | 7/1969 | Giordmaine | 331/96 |
| 3,654,482 | 4/1972 | Massey | 372/100 X |
| 4,639,923 | 1/1987 | Tang et al. | 372/21 |
| 5,017,806 | 5/1991 | Edelstein et al. | 307/428 |
| 5,023,477 | 6/1991 | Valley et al. | 307/425 |
| 5,052,815 | 10/1991 | Nightingale et al. | 372/94 |
| 5,079,445 | 1/1992 | Guyer | 359/330 |
| 5,123,022 | 6/1992 | Ebbers et al. | 372/22 |
| 5,235,456 | 8/1993 | Guyer et al. | 359/330 |
| 5,276,548 | 1/1994 | Margalith | 359/330 |
| 5,291,503 | 3/1994 | Geiger et al. | 372/21 |
| 5,321,718 | 6/1994 | Waarts et al. | 372/108 |
| 5,390,211 | 2/1995 | Clark et al. | 372/95 |
| 5,406,409 | 4/1995 | Harlamoff et al. | 359/330 |
| 5,594,592 | 1/1997 | Harlamoff et al. | 359/330 |

OTHER PUBLICATIONS

Copy of International Search Report from a foreign patent office, issued in a counterpart application.

*Primary Examiner*—Brian Healy
*Attorney, Agent, or Firm*—Limbach & Limbach L.L.P.

[57] ABSTRACT

An optical parametric oscillator or OPO (20) includes an elongated resonant cavity (22) for signal light, having a parametric gain medium (28) disposed therein for converting pump light to signal light. The resonant cavity has a output coupling device (26) at one end thereof and a Porro prism (24) at the opposite end thereof. The OPO includes an optical arrangement (30, 39 and 40) for directing pump light to make counterpropagating initial and return passes longitudinally through the gain medium at an angle (36) to the axis (23) of the resonant cavity.

15 Claims, 4 Drawing Sheets

OPTICAL PARAMETRIC OSCILLATOR WITH PORRO PRISM CAVITY

This is a continuation of application Ser. No. 08/657,104 filed on Jun. 3, 1996, now abandoned.

TECHNICAL FIELD OF THE INVENTION

The present invention relates generally to optical parametric oscillators (OPOs). The invention relates in particular to an OPO arranged such that a pump beam counterpropagates through a gain medium in a resonant cavity at an angle to the cavity axis, and wherein the resonant cavity is terminated at one end thereof by a Porro prism.

DISCUSSION OF BACKGROUND ART

Optical parametric oscillators (OPOS) are based on the combination of an optically pumped parametric gain medium, which provides optical gain, disposed within an optical resonant cavity. The parametric gain medium is typically an optically nonlinear crystal.

A parametric mixing process in the non-linear crystal provides gain by converting pump light at a frequency $\omega_{pump}$ to light at optical output frequencies $\omega_{signal}$ (signal light) and $\omega_{idler}$ according to the following expression.

$$\omega_{pump} = \omega_{signal} + \omega_{idler} \quad (1)$$

The optical resonant cavity provides feedback of amplified signal light which leads to sustained oscillation or resonating of the signal light, and the production of usable signal light output. The signal light may be defined as laser-like light The frequencies of the signal light and idler beams can be tuned over a wide range by adjusting angular alignment and/or temperature of the non-linear crystal, which affects the indices of refraction. The output frequencies are a function of the indices of refraction. OPOs are thus useful sources of tunable laser-like light.

For several potential applications which might benefit from such a light source, the signal light output beam of prior art OPOs has too great a divergence. Further, even if line-narrowing elements such as diffraction gratings are incorporated in the resonant cavity, output spectral linewidth of the signal light may still be too great for several applications.

For an optical parametric gain medium, signal light rays (resonating along a resonant cavity axis) that are noncolinear with pump light rays have phasematched wavelengths that are shifted toward the blue from colinear phasematched rays. The angular acceptance of the gain medium for noncolinear rays at a given wavelength is also far less than for colinear rays, having to satisfy a critical (linearly sensitive) rather than a noncritical (quadratically sensitive) angle condition for divergent rays in the signal-pump plane. For Type I nonlinear interactions in uniaxial crystals, this is true for noncolinearity in either the horizontal or vertical planes with respect to the crystal orientation. The imaging properties of conventional OPO resonant cavities, however, make it difficult to exploit this narrow acceptance angle feature of noncolinear phasematching.

SUMMARY OF THE INVENTION

The present invention is directed to a noncolinear pumped OPO including an elongated resonant cavity for signal light. The resonant cavity has a parametric gain medium disposed therein for converting pump light to signal light. The resonant cavity is terminated at one end thereof by a Porro prism.

The Porro prism replaces a conventional mirror having very high reflectivity for signal light, which is typically used in prior art OPOs. Such a Porro prism terminated cavity OPO has a narrower gain acceptance angle than a corresponding prior art OPO. This allows an OPO in accordance with the present invention to operate with a narrower output beam divergence than a corresponding prior art OPO.

In one preferred embodiment of an OPO in accordance with the present invention, the OPO comprises an elongated resonant cavity for signal light, and a parametric gain medium disposed within the resonant cavity for converting a pump light beam to a signal light beam. The signal light beam resonates along a cavity axis extending longitudinally through the gain medium. The resonant cavity has a Porro prism at one end thereof for fully reflecting the signal light beam, and a signal light output coupling device at the other end thereof for partially reflecting the signal beam and coupling an output portion of the signal light beam out of said resonant cavity. The OPO includes an optical arrangement for directing the pump beam to make first and second counterpropagating passes generally longitudinally through the gain medium along a path noncolinear with the cavity axis in two mutually perpendicular planes.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
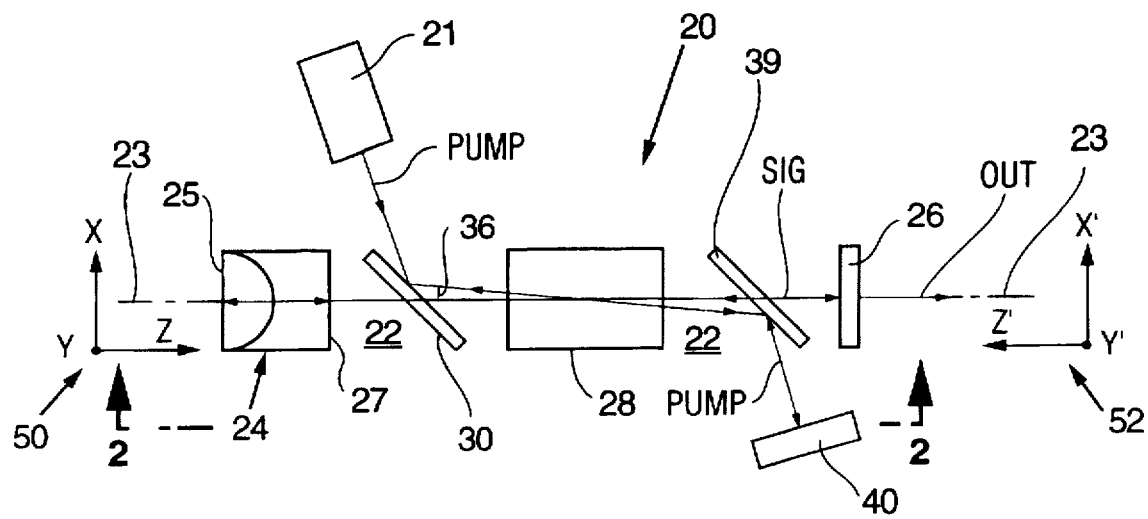
FIG. 1 is an elevation view schematically illustrating a preferred embodiment of a noncolinear repumped OPO in accordance with the present invention, including a resonant cavity having a parametric gain medium therein and formed from a Porro prism and an output coupling device.
Figure 2:
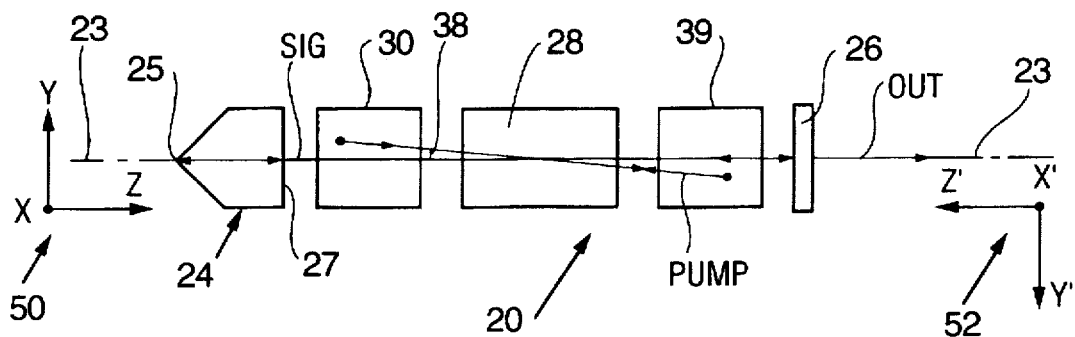
FIG. 2 is a plan view of the noncolinear repumped OPO of FIG. 1 seen generally in a direction 2—2 of FIG. 1.

Turning now to the drawings, wherein like components are designated by like reference numerals, FIG. 1 and FIG. 2 schematically illustrate a preferred embodiment 20 of a noncolinear pumped OPO in accordance with the present invention, arranged for Type I phasematching. A resonant cavity (or resonator cavity) 22 for signal light is formed from a Porro prism 24 having a roof-edge 25, and a signal light output coupling device 26.

It should be noted here that, in general terms, above-discussed equation (1) states that pump light in the parametric gain medium generates light of two wavelengths. Either of these wavelengths can be selectively resonated to provide signal light, the other being defined as the idler. It is usually, but not necessarily, the shorter of the two wavelengths which is selected to be resonated. Throughout this description and appended claims, the term signal light refers to that light wavelength which is selected to be resonated, whether or not it is the longer or shorter wavelength.

Continuing now with reference to FIGS. 1 and 2, output coupling device 26 is represented in FIGS. 1 and 2 as a planar optical element which is partially reflective and partially transmissive for laser light. Porro prism 24 reflects light by total internal reflection and is essentially fully reflective for the signal light. Preferably, entrance face 27 of Porro prism 24 is anti-reflection coated for signal light.

A parametric gain medium (typically an optically nonlinear crystal) 28 is disposed in cavity 22. Signal light generated by optically pumping gain medium 28 oscillates (resonates) along a cavity axis 23 as indicated by arrowed line SIG, coincident therewith. A portion (OUT) of the oscillating signal light is coupled out of resonant cavity 22 via output coupling device 26.

Figure 3:
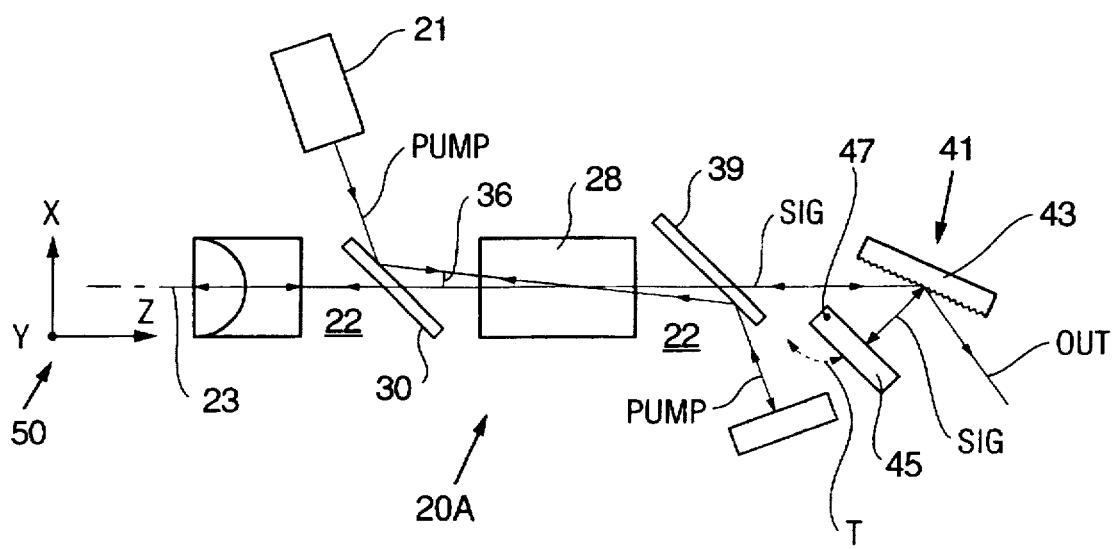
FIG. 3 is a side elevation view of another embodiment of a noncolinear repumped OPO in accordance with the present invention having an output coupling arrangement including a mirror and a reflective diffraction grating in a Littman configuration.

Referring to FIG. 3, in another embodiment 20A of an OPO in accordance with the present invention, a combination 41 of reflective diffraction grating 43, at grazing incidence to axis 23, and a mirror 45 are used as an output coupling device in place of partially reflective, partially transmissive element 26. A portion (OUT) of the oscillating signal light, here, is coupled out of resonant cavity 22 via the 0th order reflection of diffraction grating 43. Mirror 45 is tiltable about an axis 47 (as indicated by arrow T) for tuning signal light wavelength. Signal light bandwidth is narrowed by the grating. This configuration of mirror 45 and grating 43 is referred to by practitioners of the art as a "Littman" configuration or mode of the diffraction grating.

In both embodiment 20 and embodiment 20A, pump light (PUMP) is directed, from a pump-light source 21 transversely into cavity 22 and is incident on a beamsplitter element 30 which is highly reflective for pump light and highly transmissive for signal light. Beamsplitter 30 directs the incident pump light to make an initial longitudinal pass through gain medium 28 at an angle 36 to axis 23 in a plane parallel to roof-edge 25 of Porro prism 24, and an angle 38 to axis 23 in a plane perpendicular to roof-edge 25 of Porro prism 24. Given the relatively small diameter of a resonating signal light beam, it is important that roof-edge 25 of Porro prism 24 be essentially a knife-edge.

A beamsplitter 39, highly reflective for pump light and highly transmissive for signal light, and a mirror 40 highly reflective for pump light, are arranged to redirect the pump beam on a return longitudinal pass through gain medium 28 along the same path as the initial pass. Such two-pass pumping is usually referred to by practitioners of the art as repumping. Pumping at an angle to the resonant-cavity axis in two mutually perpendicular planes may be referred to as bi-noncolinear pumping. Although in FIGS. 1 and 2 pump light is depicted as being directed initially through gain medium 28 from the side thereof facing Porro Prism 24, pump light may, alternatively, be directed from the side of the gain medium facing output coupling device 26, being returned, of course, from the opposite side of the gain medium.

Angles 36 and 38, are preferably about equal and are typically less than about five degrees (5°) external to gain medium 28, such that desired portions of what is essentially a cone of signal light radiation generated by the passage of pump light through the gain medium can be resonated within cavity 22. Preferably angles 36 and 38 are about 1.0° external to gain medium 28, that being equivalent to about 0.6° inside the gain medium. Thus, pump light beams, while not exactly axially propagating through the gain medium, may still be properly defined as longitudinally propagating.

Figure 4:
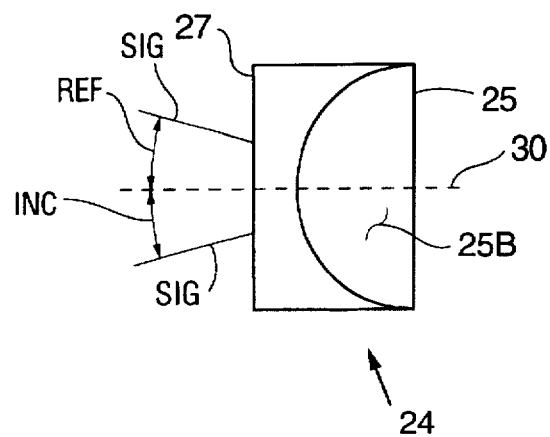
FIGS. 4, 5 & 6 are respectively side and end elevation views and a plan view schematically illustrating optical functions of the Porro prism in the OPO of FIG. 1.
Figure 5:
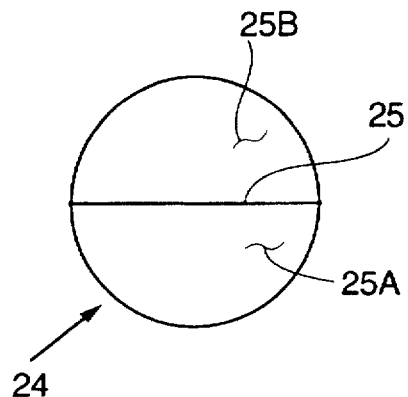
Figure 6:
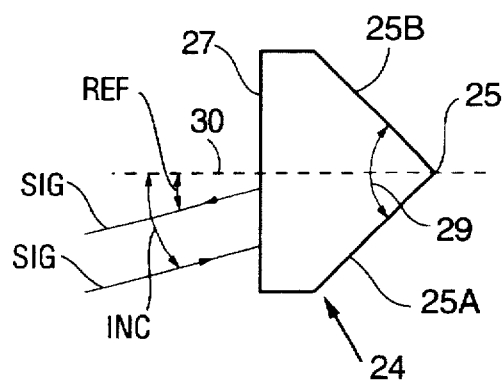

Referring now to FIGS. 4, 5, and 6, action of Porro prism 24 with respect to signal light incident thereon is illustrated. Porro prism 24 is preferably made from solid glass or solid fused silica. Porro prism 24 may be a conventional Porro prism, wherein roof angle 29 thereof is nominally exactly ninety degrees. Preferably, however, the roof angle is made about eight seconds of arc less than ninety degrees, i.e., about eighty-nine degrees, fifty-nine minutes and fifty-two seconds of arc (89°59'52").

FIG. 4 illustrates signal light (SIG) incident, non-normally with respect to entrance face 27, at an angle (INC) on Porro prism 24 in a plane parallel to roof-edge 25 thereof. The incident signal light is reflected from prism face 25A or 25B at a reflection angle (REF) equal to the angle of incidence. This is the well known incidence/reflection angle law for a mirror in any plane of incidence. Porro prism 24 differs from a mirror in that, in a plane perpendicular to roof-edge 25 thereof, an incident beam at any angle is retroreflected, i.e, it is returned along a reflection path parallel to its incidence path as illustrated in FIG. 6.

It can be seen from the foregoing discussion that a Porro prism simply provides an optical device which functions as a mirror for light incident thereon in a first plane and as retroreflector for light incident thereon in a second plane perpendicular to the first plane. Those familiar with the optical art will recognize that, in theory at least, other optical arrangements may be devised will act in a similar manner, for example two plane mirrors inclined at 90° to each other and forming a "hollow-corner". Porro prism 24 is preferred, however, because it provides for essentially lossless, complete reflection of signal light at angled reflecting surfaces 25A and 25B thereof; does not require any fixtures or adhesives to maintain a precise angular relationship between reflecting faces; and provides that the angled reflecting faces may be joined, inseparably, at an essentially zero-thickness joint, i.e., roof-edge 25.

Continuing with reference again to FIGS. 1 and 2, as illustrated by coordinate systems 50 and 52, signal light rays and pump light rays propagating from left to right (the +z direction) have their angles specified by $\Theta_x$ and $\Theta_y$. Those propagating from right to left (the +z' direction) have their angles to the cavity resonant axis 23 specified by $\Theta_{x'}$ and $\Theta_{y'}$.

If the forward or initial pump beam has angular coordinates $\{\Theta_{pumpx}, \Theta_{pumpy}\}$, then the return pump beam angular coordinates are determined by the following expression.

$$\{\Theta_{pumpx'}, \Theta_{pumpy'}\} = \{-\Theta_{pumpx}, \Theta_{pumpy}\} \qquad (2)$$

A reflection of signal light off output coupling mirror 26 causes the reflected signal rays to transform from unprimed coordinate system 50 to the primed coordinate system 52 in accordance with the following transformation.

$$\{\Theta_x, \Theta_y\} \rightarrow \{\Theta_{x'} = \Theta_x, \Theta_{y'} = -\Theta_y\} \qquad (3)$$

Signal light retroreflected from Porro prism 24 has angular coordinates transformed differently. The transformation can be defined by as follows $$\{\Theta_x, \Theta_y\} \mapsto \{\Theta_x = \Theta_x, \Theta_y = \Theta_y\} \quad (4)$$

Figure 7:
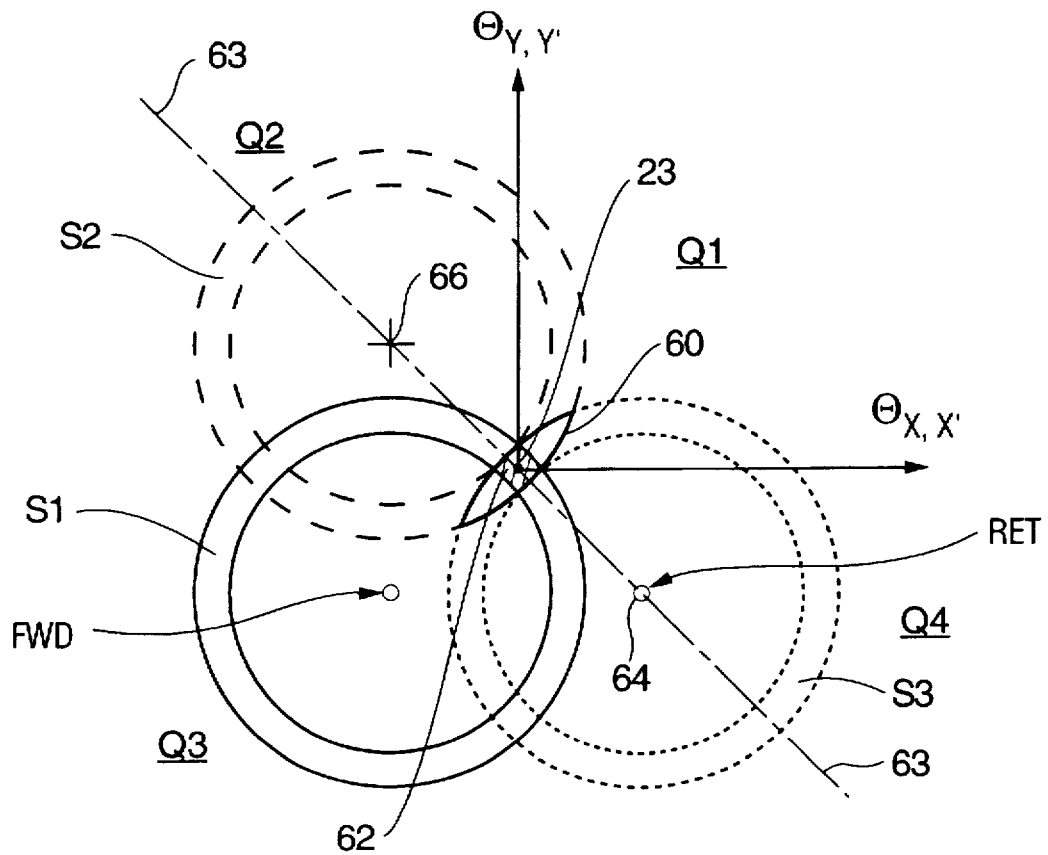
FIG. 7 is an angle-space diagram schematically illustrating forward and return pump beams as seen by sequential oscillations of a signal beam in the gain medium of the noncolinear repumped OPO of FIG. 1.

Referring now to FIG. 7, the beam divergence reducing effect of the combination of noncolinearity of pump beams, the reflection properties of a Porro prism, and double-pass pumping is illustrated in an angle-space diagram (a cartesian coordinate system in which the x and y axes are in dimensions of angle) representing any transverse plane in gain medium 28, with respect to coordinate systems 50 and 52. The forward-going (initial) pump direction is indicated by a small circle (FWD) in the third quadrant Q3 ($\Theta_x<0, \Theta_y<0$). The return pump direction is indicated by a small circle (RET) in the fourth quadrant ($\Theta_x<0, \Theta_y<0$). The initial and return pump direction is noncolinearly aligned with optical cavity axis 23 which forms the origin of the coordinate systems. The z and z' axes are perpendicular to the plane of the illustration of FIG. 7.

Pump light is typically supplied in the form of a high energy pulse of relatively short duration, for example a few nanoseconds. As nanosecond class OPOs have very few round trip times compared to the length or duration of the pump pulse (typically 5 to 50), the first few round trips where signal light builds up in the resonant cavity are critical to determining which oscillating mode will be established in the cavity. As the gain per pass is very high (often>100), signal light that sees even a single additional pass worth of gain will overwhelm other light in the cavity. Porro prism 24 has the effect of providing more than a second pass of gain occurs in only a narrow angle-space of the gain medium. This results in the very narrow beam divergence characteristic of an OPO in accordance with the present invention. The manner in which this occurs is discussed in further detail hereinbelow.

Signal light is generated by pump light passing through gain medium 28 in the form of a cone of signal light rays propagating generally in the same direction as the pump light. The signal light is generated in a relatively broad spectrum of wavelengths, the longest wavelength thereof being on the axis of the cone, with wavelengths decreasing with increasing (off axis) angles from the axis of the cone.

Figure 8:
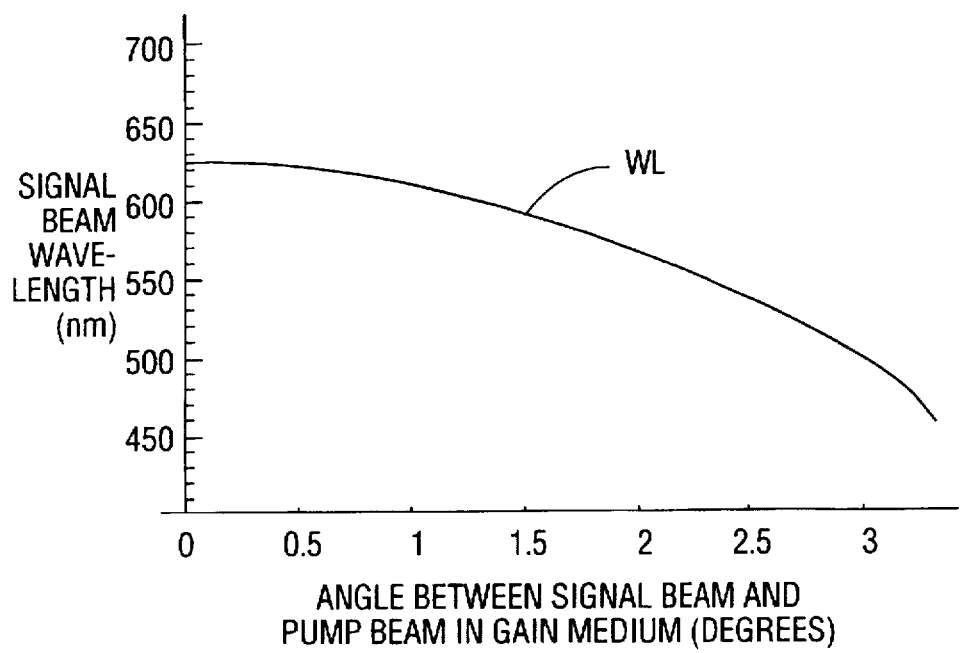
FIG. 8 is a graph schematically illustrating resonating wavelength as a function of noncolinearity of pump beam path and resonant-cavity axis in an OPO in accordance with the present invention.

Measured optical parametric gain wavelength vs. (off-axis) angle in the gain medium for a beta barium borate ($\beta$—$BaB_2O_4$ or BBO) crystal gain medium, for pump light at 355 nm wavelength, is illustrated (curve WL) in FIG. 8. Pump light angle was 32.65 degrees with respect to the c-axis of the crystal. In order to resonate at a specific wavelength, the off axis angle for that wavelength would be the noncolinear angle (in the gain medium) between the pump beam path and the resonating signal light path, i.e., between the pump beam path and the resonant-cavity longitudinal axis.

Figure 9:
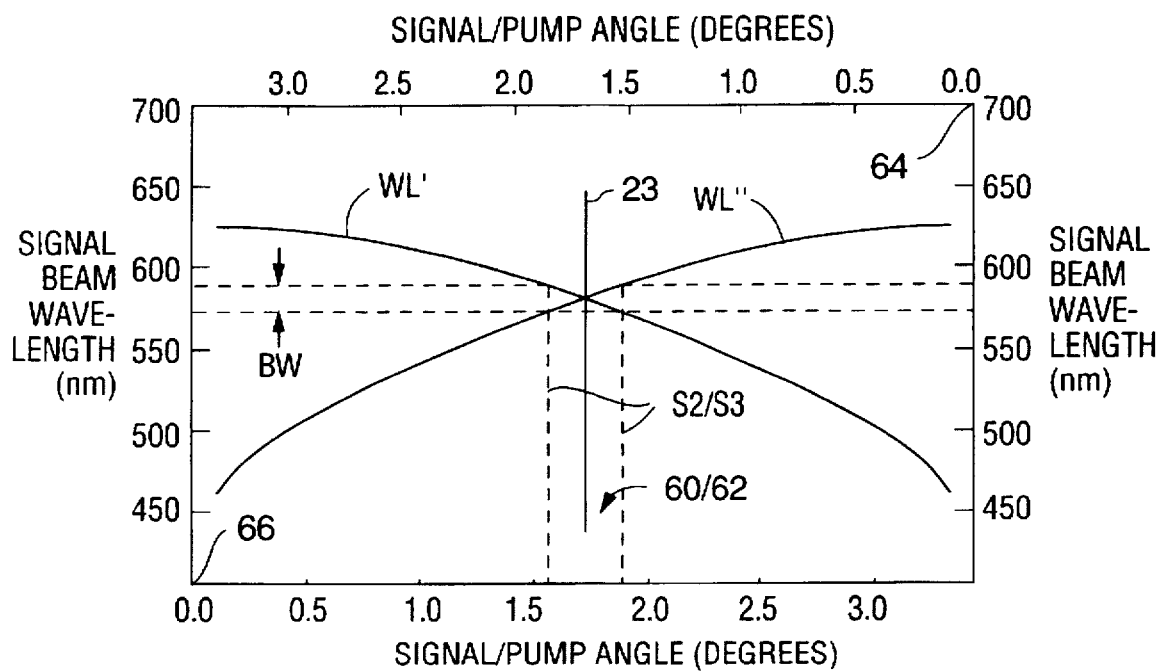
FIG. 9 is a graph schematically illustrating relationship of signal light bandwidth to angular gain acceptance of an OPO in accordance with the present invention.

FIG. 9 shows, the wavelength versus angle curve (WL) of FIG. 8 twice superimposed onto an arbitrary axis 63 of FIG. 7 passing through centers 66 and 64 of annuli S2 and S3 respectively. Resulting curves WL' and WL", having origins 66 and 64 respectively, have opposite slopes (wavelength v. angle) which intersect on axis 23 at the nominal signal light wavelength. The relationship between signal light bandwidth (BW) and the restricted angle-space band in which resonance occurs is also schematically shown. Lines S2/S3 here corresponding generally to the center thickness of lens-shaped region 60 of FIG. 7, lines S2/S3 are defined by projections of the resonating bandwidth BW. The angular gain acceptance represented by FIG. 9 is the angular separation of lines S2/S3. It should be noted, however, that, for clarity of illustration, bandwidth BW and the angular gain acceptance are shown greatly exaggerated in width compared with what they would actually be in an OPO in accordance with the present invention.

Continuing with reference again to FIG. 7, the solid annulus (S1) centered on pump beam FWD represents the signal light or parametric fluorescence in the bandwidth BW produced by an initial pass of the pump beam. The dashed annulus (S2) is the same light, angles of which have been transformed by reflection from the output coupling mirror, as determined by equation (5). This light contained in annulus S2 is subsequently amplified by the return pump light. The region of angles in the $\{\Theta_x, \Theta_y\}$ space that derive gain from the return pump are indicated by the dotted annulus (S3).

It can be seen in FIG. 7 that there is a lens-shaped overlap region 60 of the possible offset angles of signal light resulting from the return pump light with the possible offset angles of reflected signal light from the initial pump light. This lens shaped region is thus a region in which initially generated signal light undergoes two passes of gain or amplification.

Twice amplified light from this lens-shaped region is reflected by Porro prism 24 according to the transform rule of equation (4), which does not change its orientation in the coordinate scheme of FIG. 7. This retroreflected, twice-amplified light thus returns, in the forward (+z) direction, through the lens-shaped region. Within the lens-shaped region, there is a generally rectangular region 62 which is defined by the overlap of lens-shaped region 60 with the annular region, S1, of light generated by the initial pass of the pump beam. Rectangular region 62 thus represents a restricted angle-space region in which the twice amplified light undergoes an additional, (third) pass of gain or amplification. Considering signal light originating from the return or repump, it can be seen that after reflection from Porro prism 24 and a gain pass from the forward pump, the two-pass overlap region is already the same as the region resulting from the above-described three gain-passes.

A Porro prism terminated cavity OPO in accordance with the present invention provides that more than a second gain pass through the gain medium can only occur in a restricted angle-space within the gain medium. Because of this, the net angular gain-acceptance the OPO cavity is significantly less than that which would be obtained from prior art OPO resonant cavities. This leads to a more narrow divergence of the output signal and superior beam quality factor, both of which are desirable for many applications.

The decrease in the gain acceptance angle in the cavity has the beneficial effect of reducing the bandwidth of the output signal light, as wide angular acceptance is coupled through phasematching relationships to wide frequency acceptance. Because of this, a noncolinear pumped, Porro prism terminated cavity OPO in accordance with the present invention operates with significantly smaller spectral bandwidth than prior art noncolinear pumped OPOs.

In one example of a Porro prism terminated cavity, bi-noncolinear pumped OPO in accordance with the present invention, having a general arrangement similar to OPO 20 of FIGS. 1 and 2, the pump wavelength was 355 nm, and the nonlinear crystal was a BBO crystal between about ten millimeters (10 mm) and 15 mm in length, oriented for type I phasematching with a crystal cut angle of approx 28°. This combination allowed for a signal light wavelength tuning range of 420–710 nanometers (nm) with corresponding idler wavelengths of 710–2300 nm. The noncolinear angle for both the horizontal and vertical planes was approximately 1° external to the crystal. The divergence of the output beam was about one milliradian. When the signal wave was resonated in a cavity similar to cavity 22A, including a Littman configuration grating and angle-adjustable tuning mirror as discussed above with reference to FIG. 3, the Porro-prism-terminated cavity OPO produced a tunable output of several millijoules (mJ) with a linewidth of <0.1 cm$^{-1}$, and an output beam divergence consistent with output beam (OP) being a few times diffraction limited. In all cases, it was found that the near-field beam quality is improved by having the roof angle of the Porro prism be less by about 8 arc seconds than an exact 90 angle that usually defines a Porro prism.

While in the above-described example, a BBO crystal was used as parametric gain medium, principles of the present invention are applicable to any parametric gain medium. Preferred gain media include the group consisting of BBO, lithium niobate (LiNbO$_3$), potassium niobate (KNbO3) lithium iodate (LiIO$_3$), potassium titanium phosphate (KTiOPO$_4$ or KTP), lithium borate (LiB$_2$O$_5$ or LBO) and potassium dihydrogen phosphate (KDP), and isomorphs of KDP.

In summary, the present invention is directed to a noncolinearly-pumped optical parametric oscillator having a resonant cavity terminated at one end thereof by a Porro prism. The combination of the Porro prism-terminated resonant cavity and noncolinear pumping provide for output beam divergence and spectral bandwidth that are narrower than are typical of prior art noncolinear cavity OPOs.

The present invention has been described in terms of a preferred and other embodiments. The invention is not limited, however, to the embodiments described and depicted. Rather the invention is limited by the claims appended hereto.

What is claimed is:

1. An optical parametric oscillator, comprising
   a resonant cavity for signal light and a parametric gain medium disposed in said resonant cavity for converting pump light to signal light, said resonant cavity being terminated at one end thereof by a Porro prism, and said resonant cavity arranged such that said signal light resonates along a longitudinal axis of said resonant cavity; and
   means for directing said pump light to make generally longitudinally counterpropagating initial and return passes through said gain medium along a path noncolinear with said longitudinal axis.

2. The optical parametric oscillator of claim 1, wherein said noncolinear path is noncolinear with said longitudinal axis in two mutually perpendicular planes.

3. The optical parametric oscillator of claim 1, wherein said resonant cavity is terminated at an opposite end thereof by an output coupling device, said output coupling device including a combination of a mirror and a reflective diffraction grating in the Littman configuration.

4. The optical parametric oscillator of claim 1, wherein said gain medium is a material selected from the group consisting of barium borate, lithium niobate, potassium niobate, lithium iodate, potassium titanium phosphate, lithium borate, and potassium dihydrogen phosphate, and isomorphs of potassium dihydrogen phosphate.

5. The optical parametric oscillator of claim 1 wherein said Porro prism has a roof angle of about eighty-nine degrees, fifty-nine minutes and fifty-two seconds of arc.

6. An optical parametric oscillator, comprising:
   a resonant cavity for signal light, and a parametric gain medium disposed within the resonant cavity for converting pump light to said signal light, said resonant cavity having a longitudinal axis;
   said resonant cavity having an output coupling device at one end thereof for coupling an output portion of said signal light beam out of said resonant cavity and a Porro prism at an opposite end thereof for fully reflecting said signal light beam, said Porro prism having a roof-edge, and a roof angle; and
   means for directing said pump light to make first and second counterpropagating passes generally longitudinally through said gain medium along a path noncolinear with said cavity axis in two mutually perpendicular planes, a first thereof parallel to said roof-edge and a second thereof perpendicular to said roof-edge.

7. The optical parametric oscillator of claim 6 wherein said roof angle is about eighty-nine degrees, fifty-nine minutes and fifty-two seconds of arc.

8. The optical parametric oscillator of claim 6 wherein said output coupling device includes a combination of a mirror and a reflective diffraction grating in a Littman configuration.

9. The optical parametric oscillator of claim 6, wherein said gain medium is a material selected from the group consisting of barium borate, lithium niobate, potassium niobate, lithium iodate, potassium titanium phosphate, lithium borate, and potassium dihydrogen phosphate, and isomorphs of potassium dihydrogen phosphate.

10. An optical parametric oscillator, comprising
    a resonant cavity for signal light and a parametric gain medium disposed in said resonant cavity for converting pump light to signal light, said resonant cavity being terminated at each end thereof by first and second optical devices, and said resonant cavity arranged such that said signal light resonates along a longitudinal axis of said resonant cavity;
    means for directing said pump light to make generally longitudinally counterpropagating initial and return passes through said gain medium along a path noncolinear with said longitudinal axis in first and second mutually perpendicular planes;
    said first optical device functioning as a mirror for light incident thereon in said first and second mutually perpendicular planes; and
    said second optical devices arranged to function as a mirror for signal light incident thereon in one of said first and second mutually perpendicular planes, and as a retroreflector for signal light incident thereon in the other of said mutually perpendicular planes.

11. An optical parametric oscillator, comprising
    a resonant cavity for signal light and a parametric gain medium disposed in said resonant cavity for converting pump light to signal light, said resonant cavity being terminated at first and second opposite ends thereof by respectively first and second optical devices, and said resonant cavity arranged such that said signal light resonates along a longitudinal axis of said resonant cavity;
    means for directing said pump light to make generally longitudinally counterpropagating initial and return passes through said gain medium along a path noncolinear with said longitudinal axis in first and second mutually perpendicular planes;
    said first said optical device arranged to function as a mirror for signal light incident thereon in said first plane, and as a retroreflector for signal light incident thereon in said second plane;
    said second optical device arranged to function as a mirror for signal light incident thereon in said first and second planes;
    said first and second optical devices, said gain medium and said noncolinear pump path arranged such that, in an angular coordinate plane in said gain medium transverse to said longitudinal axis, said pump light on said initial and return passes generates signal light in respectively first and second gain regions, and signal light generated by said initial pump-light pass and reflected from said second optical device passes through a third gain region, said second and third annular gain regions overlapping, the overlapping portions thereof to defining a fourth gain region, and said first and fourth gain regions overlapping, the overlapping portions thereof defining a fifth gain region; and wherein, only in said fifth gain region may generated signal light undergo three passes of gain.

12. An optical parametric oscillator, comprising a resonant cavity for signal light and a parametric gain medium disposed in said resonant cavity for converting pump light to signal light, said resonant cavity being terminated at first and second opposite ends thereof by respectively first and second optical devices, and said resonant cavity arranged such that said signal light resonates along a longitudinal axis of said resonant cavity;

means for directing said pump light to make generally longitudinally counterpropagating initial and return passes through said gain medium along a path noncolinear with said longitudinal axis in first and second mutually perpendicular planes;

said first said optical device arranged to function as a mirror for signal light incident thereon in said first plane, and as a retroreflector for signal light incident thereon in said second plane;

said second optical device arranged to function as a mirror for signal light incident thereon in said first and second planes;

said first and second optical devices, said gain medium and said noncolinear pump path arranged such that, within said gain medium transverse to said longitudinal axis, said pump light on said initial and return passes generates signal light in respectively first and second gain regions, and signal light generated by said initial pump-light pass and reflected from said second optical device passes through a third gain region, said second and third annular gain regions overlapping, the overlapping portions thereof defining a fourth gain region wherein signal light may be twice amplified; and said first and second optical devices, said gain medium and said noncolinear pump path arranged such that twice-amplified signal light from said fourth gain region incident on said first optical device is retroreflected thereby back through said fourth gain region, and also arranged such that said first gain region overlaps said fourth gain region and defines, within said fourth gain region, a fifth gain region wherein retroreflected twice-amplified signal light becomes thrice amplified.

13. An OPO comprising:

a resonant cavity, said resonant cavity including at least first and second reflectors;

a non-linear crystal disposed in said resonant cavity;

a source for generating laser pump pulses to excite the crystal and generate and amplify signal light, the resonant cavity arranged such that said generated and amplified signal light resonates along a longitudinal axis of the cavity;

means for directing the pump pulses along a path non-colinear with the axis of the cavity;

and wherein one of said reflectors of said resonant cavity is defined by a reflector means having two reflecting surfaces disposed at about ninety degrees to each other, with the noncolinear path angle of the pump pulse and the angle of the reflector means being chosen such that generated signal light can undergo multiple amplification passes through the crystal only in a narrow angular region thereof aligned with the cavity axis, thereby confining resonating signal light beam to said narrow angular region and minimizing the divergence of said resonating signal light.

14. An OPO as recited in claim 13, wherein said reflector means is a Porro prism.

15. An OPO as recited in claim 14, wherein generated signal light can undergo no more than two amplification passes outside said narrow angular region of said crystal.

* * * * *